(12) United States Patent
Rimkus

(10) Patent No.: US 9,651,454 B2
(45) Date of Patent: May 16, 2017

(54) SYSTEM FOR CHECKING A COMBUSTION ENGINE COUPLED WITH AN ELECTRIC GENERATOR OF A HYBRID TERRESTRIAL VEHICLE HAVING A DRIVE LINE DRIVEN BY AT LEAST ONE ELECTRIC MOTOR

(71) Applicant: FPT Motorenforschung AG, Arbon (CH)

(72) Inventor: Torsten Rimkus, Roggwil (CH)

(73) Assignee: FPT Motorenforschung AG, Arbon (CH)

( * ) Notice: Subject to any disclaimer, the term of this patent is extended or adjusted under 35 U.S.C. 154(b) by 196 days.

(21) Appl. No.: 14/397,142

(22) PCT Filed: Apr. 5, 2013

(86) PCT No.: PCT/EP2013/057171
§ 371 (c)(1),
(2) Date: Oct. 24, 2014

(87) PCT Pub. No.: WO2013/160084
PCT Pub. Date: Oct. 31, 2013

(65) Prior Publication Data
US 2015/0144077 A1    May 28, 2015

(30) Foreign Application Priority Data

Apr. 26, 2012    (EP) ..................................... 12165699

(51) Int. Cl.
| | |
|---|---|
| G06F 7/00 | (2006.01) |
| G01M 15/04 | (2006.01) |
| B60K 6/46 | (2007.10) |
| B60W 10/06 | (2006.01) |
| B60W 10/08 | (2006.01) |

(Continued)

(52) U.S. Cl.
CPC ............. *G01M 15/044* (2013.01); *B60K 6/46* (2013.01); *B60W 10/06* (2013.01); *B60W 10/08* (2013.01);

(Continued)

(58) Field of Classification Search
CPC ...... B60L 11/1861; B60L 3/12; B60K 7/0007; B60W 10/06; B60W 20/00; B60W 10/08;

(Continued)

(56) References Cited

U.S. PATENT DOCUMENTS

| | | | |
|---|---|---|---|
| 6,326,702 B1 | 12/2001 | Yonekura et al. | |
| 6,604,032 B1 * | 8/2003 | Moller | ................... F02D 41/22 |
| | | | 701/114 |

(Continued)

FOREIGN PATENT DOCUMENTS

| | | |
|---|---|---|
| DE | 102006012858 | 9/2007 |
| DE | 102008040431 | 1/2010 |

(Continued)

OTHER PUBLICATIONS

JP 2007 118764 A translation.*

*Primary Examiner* — Marguerite McMahon
*Assistant Examiner* — Tea Holbrook
(74) *Attorney, Agent, or Firm* — Stetina Brunda Garred and Brucker

(57) ABSTRACT

System for checking a combustion engine (1) coupled with an electric generator (2) of a hybrid terrestrial vehicle having at least a drive line (61, 62) driven by at least one electric motor (51, 52); the combustion engine (1) comprising at least one subsystem to be checked; the system further comprising first control means (3) configured to drive the combustion engine (1) at a predefined deterministic operation point, wherein the system comprises second control means able to perform a diagnostic test on the subsystem wherein the first control means (3) are configured to vary the operation conditions of the combustion engine (1) in order to allow the second control means (ECU) to perform diagnostic test.

12 Claims, 2 Drawing Sheets

(51) Int. Cl.
*B60W 20/00* (2016.01)
*B60W 20/50* (2016.01)
*F02D 41/22* (2006.01)
*F02D 29/06* (2006.01)
*F02B 63/04* (2006.01)
*B60W 50/08* (2012.01)
*B60W 50/04* (2006.01)

(52) U.S. Cl.
CPC ............ *B60W 20/00* (2013.01); *B60W 20/50* (2013.01); *F02B 63/04* (2013.01); *F02D 29/06* (2013.01); *F02D 41/22* (2013.01); *B60W 50/08* (2013.01); *B60W 2050/041* (2013.01); *Y02T 10/6217* (2013.01); *Y02T 10/6286* (2013.01)

(58) Field of Classification Search
CPC .......... B60W 2050/041; B60W 20/50; B60W 50/08; G07C 5/0808; G05B 23/0235; F02B 63/04; F02D 29/06; F02D 41/22; G01M 15/044
See application file for complete search history.

(56) References Cited

U.S. PATENT DOCUMENTS

| | | | |
|---|---|---|---|
| 2007/0233332 A1 | 10/2007 | Kawada | |
| 2008/0201062 A1* | 8/2008 | Herz | F01M 11/10 701/103 |
| 2008/0219866 A1* | 9/2008 | Kwong | B60K 6/46 417/410.1 |
| 2009/0198396 A1* | 8/2009 | Rodriguez | B60W 10/08 701/22 |
| 2010/0100299 A1* | 4/2010 | Tripathi | F02D 41/0087 701/102 |
| 2010/0204896 A1* | 8/2010 | Biondo | B60W 30/143 701/93 |
| 2010/0213847 A1* | 8/2010 | Biondo | B60Q 1/085 315/82 |
| 2011/0010079 A1* | 1/2011 | Shutty | F02D 35/027 701/108 |
| 2011/0088674 A1* | 4/2011 | Shutty | F02D 41/0007 123/568.21 |
| 2011/0120095 A1* | 5/2011 | Wald | F01N 3/10 60/276 |
| 2011/0125361 A1* | 5/2011 | Weber | F01P 11/18 701/31.4 |
| 2011/0190973 A1* | 8/2011 | Giles | B60W 50/0205 701/31.4 |
| 2011/0259308 A1* | 10/2011 | Kato | F02D 41/126 123/690 |
| 2012/0203411 A1* | 8/2012 | Mallebrein | B60K 6/48 701/22 |

FOREIGN PATENT DOCUMENTS

| | | |
|---|---|---|
| DE | 102008064536 | 6/2010 |
| DE | 102009028374 | 2/2011 |

* cited by examiner

SYSTEM FOR CHECKING A COMBUSTION ENGINE COUPLED WITH AN ELECTRIC GENERATOR OF A HYBRID TERRESTRIAL VEHICLE HAVING A DRIVE LINE DRIVEN BY AT LEAST ONE ELECTRIC MOTOR

CROSS REFERENCE TO RELATED APPLICATIONS

The present application claims priority to PCT International Application No. PCT/EP2013/05717 filed on Apr. 5, 2013, which application claims priority to European Patent Priority No. 12165699.5 filed Apr. 26, 2012, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a system for checking a combustion engine coupled with an electric generator of a hybrid terrestrial vehicle, the kind of hybrid vehicles driven by electric motor, wherein the combustion engine has only the aim to produce electrical energy. Let us call such systems: Combustion Engine Electrical Combinations (CEEC).

DESCRIPTION OF THE PRIOR ART

Hybrid schemes, where a combustion engine is coupled with an electric generator and where the motion of the vehicle is caused only by at least one electric motor, are already known for example in the field of the naval application.

Such schemes find hard resistances in the field of the terrestrial vehicles due to the regulations on the emissions contained in the exhaust gases.

Such regulations concerning the emission are written and oriented towards the traditional vehicle or the hybrid vehicles having the combustion engine connected with drive line. In conventional vehicles, the combustion engine is coupled to the drive line (wheels, gears, chains, etc.) via one or more transmissions. If the operator wishes to change the speed of the vehicle speed, he causes a variation of the engine revolution rate. Therefore, any change of the vehicle speed involves/necessitates/determines a change of the engine revolution rate. So the operator may influence/define directly and continuously the operation conditions of the combustion engine.

Modern combustion engines have several subsystems such as turbo chargers, exhaust gas recirculation systems, etc.; it is known that subsystems not properly working have a negative impact on the exhaust gas emissions or on the engine itself.

For this reason, specific monitoring functions are normally implemented into the engine control software to monitor the correct operation of said subsystems.

The monitoring functions need specific engine speed/load ranges to be performed and in general specific functioning conditions of the engine. These ranges define the so-called "release conditions". The monitoring functions start the evaluation only when these release conditions are fulfilled. In the conventional vehicle, the release conditions occur randomly with a certain frequency depending on the drive profile defined by the operator and by the road characteristics. Drive profiles are standardized with respect to the cities or the highways. In other words, in the conventional vehicle when the release conditions occur, then the monitoring function start. Consequently the occurrence of the release conditions, needed by the monitoring functions, is unpredictable.

Despite the unpredictability of the vehicle usage, the monitoring must be performed with a certain frequency. For this reason, the engine controller records every monitoring procedure activation and calculates a so-called "In Use Performance Ratio" (IUPR). This parameter represents the ratio between the number of monitoring events to the engine drive events. IUPRs are required by law to fulfill a pre-established ratio, for example 0.336 for medium-duty vehicles in the United States. European and US OBD legislations require the vehicle manufacturers to verify the IUPR under normal usage of the customer vehicles.

These monitoring strategies cannot be applied to those CEEC vehicles, such as trains, or hybrid cars and trucks, for example. In such CEEC vehicles, the combustion engine it is not connected to the drive line of the vehicle, but it is provided only for driving an electrical generator to produce electrical power that charges a battery. The vehicle is driven by an electric motor which is fed directly by the battery and/or directly by the electrical generator.

CEECs have the advantage to constantly run the combustion engine in just one specific engine operation point, the point of higher efficiency, for example. In other words, in the most of CEECs, the combustion engine is stopped or is operated at just one specific operation point. According to other solutions, the engine is driven through a few discrete (three-four) predefined operation points selected to improve fuel saving selected according, for example, the number of loads withdrawing energy (air conditioner, etc.).

In the followings, such points are called "predefined deterministic operation points". Therefore, in contrast to conventional vehicles the combustion engine operation in a CEEC is strictly deterministic. Therefore the engine can not reach the "release conditions" need to perform the monitoring functions of the subsystems.

Most monitoring functions developed for the random operation of the conventional vehicles will never be performed in the CEEC vehicles, with the consequence that a subsystem failure will never be detected.

For this reason such vehicles do not fulfill the rules and regulations defined by law. This causes legal problems since the monitoring functions for the abovementioned subsystems are never executed and the IUPR is always 0.

SUMMARY OF THE INVENTION

Therefore it is the main object of the present invention to provide a system for checking a combustion engine coupled with an electric generator of a hybrid terrestrial vehicle having a drive line driven by at least one electric motor, which overcomes the above problems/drawbacks.

The present invention relates to a system for checking a combustion engine coupled with an electric generator of a hybrid terrestrial vehicle having a drive line driven by at least one electric motor, according to claim 1.

The systems of the prior art are usually not provided with means for performing diagnostic tests on the combustion engine subsystems as for the traditional vehicle; therefore, thanks to the present invention the hybrid system are provided of second control means able to perform a diagnostic test on said at least one subsystem and the operation conditions of the combustion engine are varied, preferably according to predefined schedules in order to allow said second control means to perform said diagnostic test.

These and further objects are achieved by means of an apparatus and method as described in the attached claims, which form an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

DETAILED DESCRIPTION OF PREFERRED EMBODIMENTS

The present invention overcomes the problems of the prior art by implementing at least one specific engine operation cycle that allows the execution of the monitoring functions on the subsystems cited above. This specific cycle can be automatically activated by a CEEC controller or manually by an operator, for example during the car revision tests.

Figure 1:
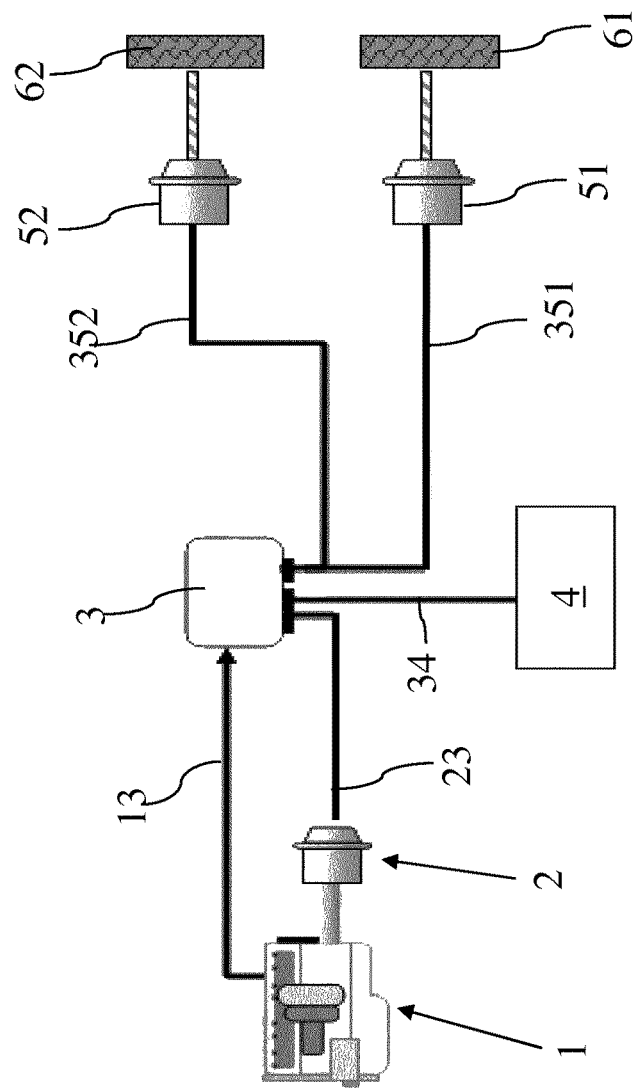
FIG. 1 shows an example of CEEC scheme according to the present invention.

With reference to FIG. 1, according to the present invention a scheme of a CEEC vehicle comprises:
- a combustion engine 1 operatively connected with an electrical generator 2;
- a battery pack 4 for storing the electrical energy produced by the generator 2
- at least one electric motor 51, 52 operatively connected with at least a wheel 61, 62 to drive thereof, and fed by said battery 4 and/or by said electrical generator 2;
- a (CEEC) controller 3 capable at least to control the combustion engine 1.

According to a preferred embodiment of the invention, the controller 3 manages the electrical flow from the generator 2 towards the battery 4 and/or towards the electric motor(s) 51/52 and/or from the battery towards the electric motor(s) 51/52. According to this embodiment, the scheme of the vehicle in FIG. 1 also shows:
- connecting means 13 between the controller 3 and the combustion engine 1 for controlling and checking the combustion engine 1, its subsystems, and the electrical generator 2 according to a bi-directional data connection;
- power connecting means 23 between the controller 3 and the electrical generator 2;
- power connecting means 34 between the controller 3 and the battery pack 4;
- power connecting means 351/352 between the controller 3 and the electric motor(s) 51/52;
- two electric motors 51 and 52, each driving directly a wheel 61 and 62.

The above scheme could be adapted to provide an electric motor for each wheel of the vehicle or for each vehicle axle or for one vehicle axle or for all the vehicle axles. In view of what discussed above, the drive line may be summarized by the wheel 61, 62. In any case the combustion engine 1 is not connected to the drive line, but on the contrary it is connected only to the electrical generator 2.

The CEEC controller 3 comprises first control means configured to drive the combustion engine at a specific engine speed that is to drive the combustion engine at just one predefined deterministic operation point. That is in a "normal condition", the combustion engine runs at just one specific speed corresponding to said specific operation point. The latter can correspond, for example, to the higher efficiency.

According to a possible embodiment, the first control means are configured to drive the combustion engine through a few discrete (three-four) predefined operation points. These latter can be selected to improve fuel saving according, for example, to the number of loads withdrawing energy (air conditioner, etc.) However in general when the combustion engine is in its "normal condition", the target of the first control means is to operate the combustion engine in the best fuel economy point. The latter may vary in function of the engine loads. Consequently the discrete predefined operation points can be defined as a function of said engine loads.

The system according to the present invention also comprises second control means able to perform a diagnostic test on at least a subsystem of the combustion engine 1, i.e. for example a turbo charger, an EGR system etc. . . . According to the present invention, the first control means are configured to disregard said predefined operation points and to vary the operation conditions of the combustion engine in order to allow said second control means to perform a diagnostic test.

In other words, in order to activate the second control means the operation of the combustion engine is changed from the "normal condition" to a "diagnostic condition" wherein the first control means can vary the engine speed and/or the load of the combustion engine so as to reach the "release conditions" needed to perform the above specific test.

Therefore the first control means are configured to drive, in said diagnostic condition, the combustion engine within at least one specific range of speeds according to a predefined speed profile which depends on the specific diagnostic test to be performed.

As above indicated, the CEEC controller 3 (more specifically the first control means) is also configured to control the electrical torque load at the generator 2 side in order to vary the torque load, at the electrical generator 2 side, towards a specific value or along a predefined torque load profile when the engine operates in the diagnostic condition and in function of the release condition to be reached.

It is clear that the variation of electrical torque load at the generator side passes on the combustion engine. By the combination of said specific combustion engine speed (range) and specific load profiles any release condition can be (virtually) simulated and that means that corresponding test can be also performed by the second control means.

Figure 2:
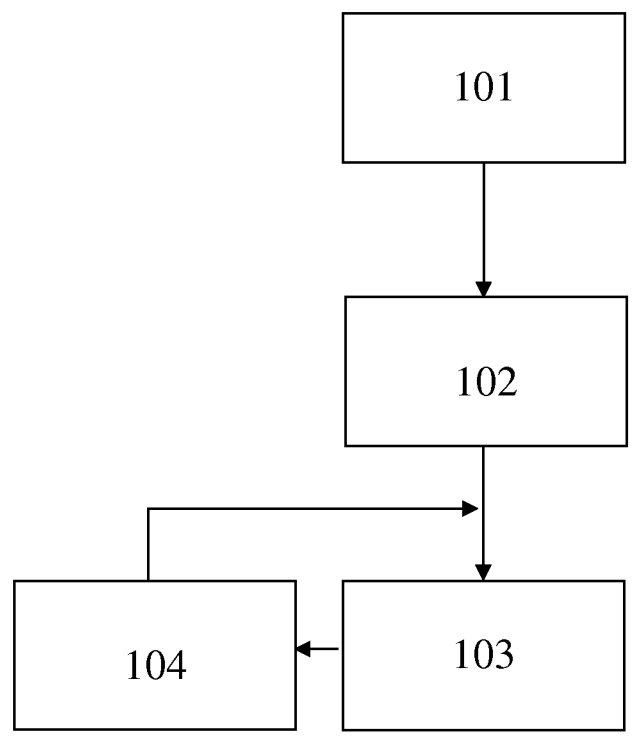
FIG. 2 shows an example of method performed by the scheme of FIG. 1.

FIG. 2 is a flow chart showing an example of a functioning procedure of the system of the present invention. In particular:

101. the operator starts the CEEC;

102. the combustion engine starts, if requested by the CEEC controller 3, which monitors the recharge condition of the battery pack 4;

103. the combustion engine 1 runs in the predefined deterministic operation point: "normal condition", either to charge the battery or to produce power to drive the propulsion system directly; after the warm up, the combustion engine 1 is ready to perform said at least one functioning cycle in order to enabling the monitoring functions.

104. the condition of the combustion engine is changed from the "normal condition" to the "diagnostic condition": the session of diagnostic tests is executed, preferably according to a schedule; then, after diagnostic tests, the system return in "normal condition": 103.

For the purposes of the present invention, functioning cycle, specific cycle, diagnostic session and test session are synonym. For example, one subsystem may need a steep engine speed increase to run its monitoring function. So, when the system operates in the diagnostic condition, the CEEC controller 3 (first control means) commands the engine to increase the engine speed and thus enables the release conditions for this monitoring function. It is assumed, for example, that the single operation point of the engine in the normal condition is 2000 rpm with a load of 80 Nm. In order to perform a specific OBD (On Board diagnostic) monitoring, it is necessary a speed increase if 500 rpm within 1 second, to keep the load constant and to hold the increase speed constant for 10 seconds. The controller (in particular the first control means) increases the engine speed with a rate of 500 rpm/s and at the same time keeps the load constant. Within the 10 seconds the OBD monitor can be performed (by the second control means) and the result be stored.

For example, another subsystem may require a specific speed AND a specific torque point. So the CEEC controller 3 commands the combustion engine to reach a predefined revolution speed and, for example, the generator to vary the load so as the release conditions for such subsystem are fulfilled. According to another embodiment an independent (controllable) resistive load is provided, so as the load profiles can be simulated through the interaction of the generator 2 and such resistive load, in order to avoid any kind of stress on the battery 4.

According to the present invention, one diagnostic cycle may realize one or more release conditions at a time. For example, the controller 3 may, step by step, drive the combustion engine through the release conditions for all the monitoring functions and perform all subsystem checks. Alternatively, the controller may schedule such release conditions in a longer time period, for example, one or more release condition after one or more firings.

Some monitoring functions may require for instance specific after treatment temperatures. In such cases, the CEEC controller 3 will then run a predefined speed with a predefined load profile once the temperature conditions are fulfilled.

In addition, according to a preferred embodiment of the invention, all the release conditions are enabled, step by step in a short time when a manual signal is sent to the CEEC controller 3, for example by means of a button on the dashboard. This in order perform a complete test cycle during vehicle revision sessions and the like.

After the conclusion of a specific cycle the CEEC controller 3 operates again in a "normal" condition, i.e. at the deterministic operation point, driving the combustion engine according a known deterministic cycle. See the example of functioning procedure on FIG. 2. These specific cycles can be automatically performed as often as required by the applicable law, e.g. in every drive cycle. Therefore, the system preferably comprises means for scheduling the test sessions able to schedule the test session according to a predefined time scheme.

The driver may be informed via a dashboard lamp or a displayed message that the diagnostics is running. The same strategy can be used in order to increase the engine load during the warm up phase to speed up the heat up of the after treatment system.

The CEEC controller 3 could be directly interfaced with or integrated in the combustion engine control unit (ECU), not shown. In addition, the diagnostic tests can be commanded either by the combustion engine controller ECU or by the CEEC controller 3. In other words the engine controller ECU or the CEEC controller can comprise said second control means provide to perform the diagnostic tests.

By means of the present invention, the hybrid vehicle provided with a combustion engine not directly driving a drive line can fulfill the technical regulations generally conceived for the traditional terrestrial vehicles.

This invention can be implemented advantageously in a computer program comprising program code means for performing one or more steps of such method, when such program is run on a computer. For this reason the patent shall also cover such computer program and the computer-readable medium that comprises a recorded message, such computer-readable medium comprising the program code means for performing one or more steps of such method, when such program is run on a computer.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the scope of the invention are deemed to be covered by this invention.

Further implementation details will not be described, as the man skilled in the art is able to carry out the invention starting from the teaching of the above description.

The invention claimed is:

1. System for checking a combustion engine coupled with an electric generator of a hybrid terrestrial vehicle having at least a drive line driven by at least one electric motor, said combustion engine comprising at least one subsystem to be checked, said system comprising first control means configured to drive the combustion engine at just one or at a few discrete predefined deterministic operation points according to a normal condition of said combustion engine, said system being characterized in that it comprises second control means able to perform at least a diagnostic test on said at least one subsystem and in that said first control means are configured to disregard said predefined deterministic operation points according to a diagnostic condition of said combustion engine and to command said combustion engine to vary operating conditions thereof in order to allow said second control means to perform said diagnostic test;

wherein, in said diagnostic condition of the combustion engine, said first control means are configured to vary the electrical torque load of the electric generator applied to the combustion engine, towards a specific value or along a predefined torque load profile.

2. System according to claim 1, wherein, in said diagnostic condition of the combustion engine, said first control means are configured to drive the combustion engine at a specific engine speed or within at least one specific range of speeds along a predefined speed profile.

3. System according to claim 1, wherein said combustion engine comprises several subsystems and said second control means are able to perform diagnostic tests on each of said several subsystems and wherein said first control means are configured to vary operating conditions of said combustion engine in order to allow said second control means to perform:

a subset of said several diagnostic tests per session and/or all of said several diagnostic tests per session.

4. System according to claim 1, wherein said combustion engine comprises several subsystems and said second control means are able to perform diagnostic tests on each of said several subsystems and wherein said first control means are configured to vary the electrical torque load towards a specific value or along a predefined torque load profile on the second control means demand.

5. System according to claim 4, further comprising means for scheduling the next diagnostic test session.

6. Method for checking a combustion engine coupled with an electric generator of a hybrid terrestrial vehicle having at least a drive line driven by at least one electric motor, said combustion engine comprising at least one subsystem to be checked and first control means configured to drive the combustion engine at a predefined deterministic operation point according to a normal condition of the combustion engine, said method being characterized by commanding said combustion engine to vary operating conditions thereof from said normal condition to a diagnostic condition wherein said deterministic operation point is not regarded to allow a diagnostic test on said subsystem, performing said diagnostic test on said at least one subsystem;

wherein, in said diagnostic condition of the combustion engine, said first control means are configured to vary the electrical torque load of the electric generator applied to the combustion engine, towards a specific value or along a predefined torque load profile.

7. Method according to claim 6, wherein said variation is so that, in said diagnostic condition, the combustion engine is driven at a specific engine speed or within at least one specific range of speeds along a predefined speed profile.

8. Method according to claim 6, wherein said variation is so that, in said diagnostic condition, the combustion engine torque load is moved towards a specific value or along a predefined torque load profile.

9. Method according to claim 6, wherein said combustion engine comprises several subsystems and wherein said variation is controlled so that a subset of said several subsystems is subjected to diagnostic tests per session and/or all of said several subsystems is subjected to diagnostic tests per session.

10. Method according to claim 9, wherein said session are scheduled according a predefined time scheme.

11. Method according to claim 6, wherein first control means control said subsystems and perform diagnostic test thereon and second control means control said electric motor and wherein said variation of the operation conditions of the combustion engine are commanded by said first or by said second control means.

12. System for checking a combustion engine coupled with an electric generator of a hybrid terrestrial vehicle having at least a drive line driven by at least one electric motor, said combustion engine comprising at least one subsystem to be checked, said system comprising first control means configured to drive the combustion engine at just one or at a few discrete predefined deterministic operation points according to a normal condition of said combustion engine, said system being characterized in that it comprises second control means able to perform at least a diagnostic test on said at least one subsystem and in that said first control means are configured to command said combustion engine to transition from a normal condition to a diagnostic condition, and vary the revolutions per minute of the combustion engine in order to allow said second control means to perform said diagnostic test.

* * * * *